Figure 1:
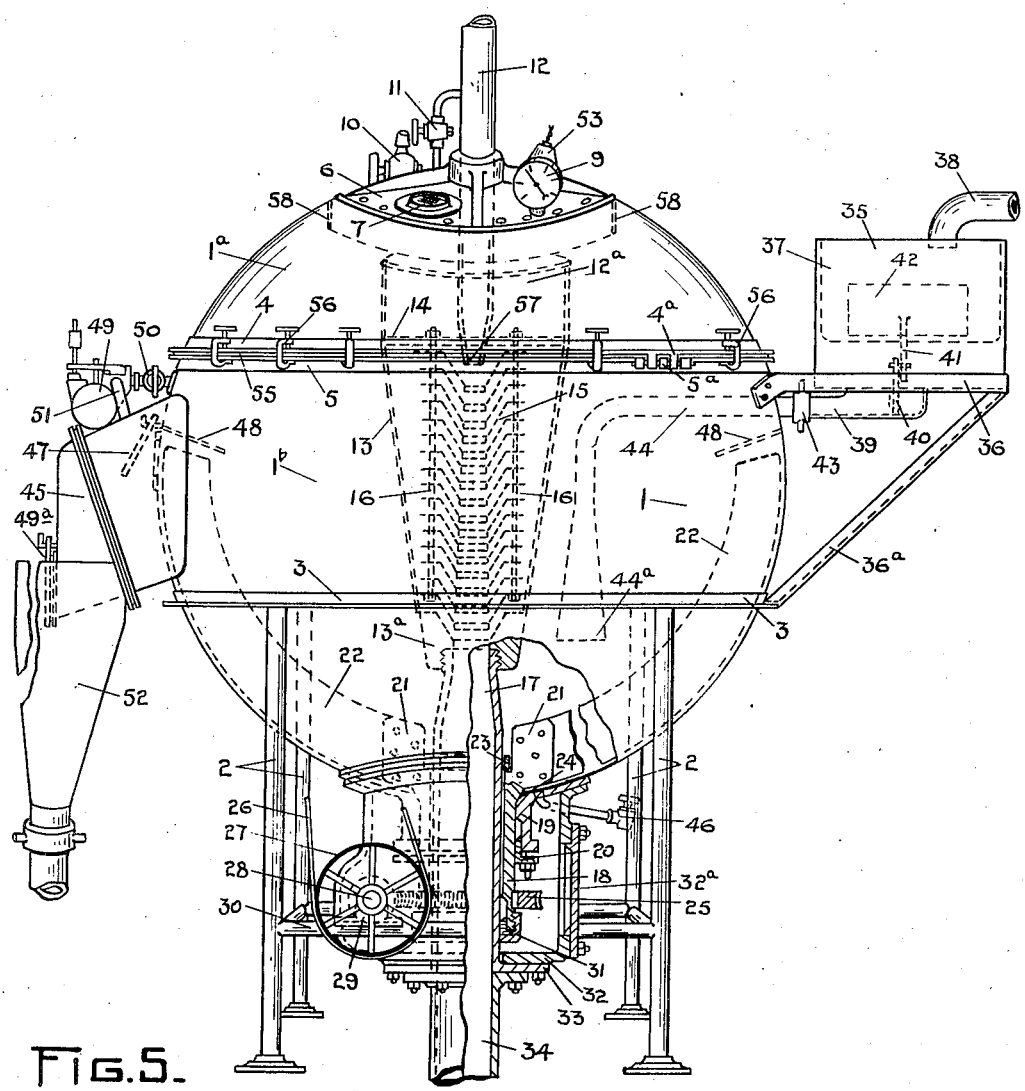

Sept. 6, 1927. 1,641,349

H. L. MURRAY
METHOD OF DEODORIZING, COOLING, AND DEHYDRATING
FLUIDS AND APPARATUS THEREFOR
Filed March 7, 1924 2 Sheets-Sheet 1

Inventor
H. L. Murray
By Marks & Clerk
Attys.

Sept. 6, 1927. 1,641,349

H. L. MURRAY
METHOD OF DEODORIZING, COOLING, AND DEHYDRATING
FLUIDS AND APPARATUS THEREFOR
Filed March 7, 1924 2 Sheets-Sheet 2

Inventor
H. L. Murray
By Marks & Clerk Attys

Patented Sept. 6, 1927.

1,641,349

UNITED STATES PATENT OFFICE.

HENRY LAMONT MURRAY, OF SOMERSTOWN, AUCKLAND, NEW ZEALAND, ASSIGNOR TO THE TE AROHA DAIRY COMPANY LIMITED, OF TE AROHA, NEW ZEALAND.

METHOD OF DEODORIZING, COOLING, AND DEHYDRATING FLUIDS AND APPARATUS THEREFOR.

Application filed March 7, 1924, Serial No. 697,683, and in New Zealand August 14, 1923.

This invention is for a method of and apparatus for deodorizing, cooling and dehydrating fluid substances on a large scale, as for instance 500 gallons per hour or more in particular, milk, cream, milk products, milk by-products, edible oils and fats and such like by eliminating offensive or undesirable volatile odors and flavours and moisture therefrom whereby the quality of the substance treated is greatly improved, and its value greatly increased. In particular the odour in milk and cream due to cows having been fed on turnips, rape and such like goods, is elminated, and further, moisture is removed from oils and fats during treatment.

The idea underlying this invention is to deodorize, cool and dehydrate fluid substances which have been first heated as by Pasteurizing, by reducing the air pressure thereon so that by evaporation odors, heat and moisture are removed from the fluid and may be carried away therefrom.

It is know that, when hot fluid is supplied to a closed container under vacuum inside thereof, the fluid is dehydrated and also cooled by the rarified atmosphere of the vacuum, the vapour being usually drawn off by a pipe and pump.

Further it is known that fluid when treated by vacuum as above described is discharged from the container periodically in a large quantity or batch at a time. In order to effect such known discharge air has to be admitted to the container and when the operation is to be repeated the vacuum has again to be made. Now according to my invention the operation is continuous, that is to say, the fluid is heated in a forewarmer such as a Pasteurizer from which it is discharged into a vacuum container from which container it is continuously although intermittently rapidly discharged whilst retaining the vacuum and the discharged fluid may be carried back to the forewarmer and the operation repeated as long and as often as desired to increase concentration as in making condensed milk.

According to my invention a vacuum is created preferably by means of a specially designed ejector condenser, in a container into which the fluid is introduced, the ejector condenser being especially designed also to carry off the odoriferous and moist vapour.

The ejector condenser is well known for steam but I use it with the cones specially arranged for the purpose of carrying out my method and also a pulsator and releaser for the discharge of the fluid intermittently but continuously so.

By my invention the following objects or advantages are attained continuously and automatically without injury to the fluid treated. (1) Deordorization. Cream, milk, oils and the like are effectively deodorized. (2) Cooling. A fluid is automatically cooled from the temperature at which it is admitted into the container to a temperature corresponding with that of the vacuum in the container. (3) Concentration. Moisture contained in the fluid is partially removed by evaporation resulting in concentration of the fluid and this can be made continuous as for condensing milk by a circulation through a forewarmer and vacuum container. (4) Reduction of acidity. The acidity of milk or cream and such like and of their fluid products and by products treated is reduced by the process and substantially less neutralizing agent such as bicarbonate of soda than usual is required to reduce the acidity to the desired point. (5) Cleanliness. The apparatus is easily accessible for cleansing purposes and it and the process are thoroughly sanitary.

The method of carrying out the invention comprises heating the fluid in a forewarmer to a desired temperature reducing the atmospheric pressure to a desired point in a closed receptacle, introducing the hot fluid to be treated into said receptacle at a regulable rate, cooling or extracting the heat, odours and moisture from said fluid in said receptacle by low atmospheric pressure, preventing the admission of air to said receptacle, applying a centrifugal force to said fluid whereby the denser portion of said fluid is driven outward to the walls of the receptacle and the vaporized portion of said fluid approaches a high pressure jet, carrying off said vaporized portion by said high pressure jet, preventing said dense liquor in said receptacle from rising beyond a predetermined point, and continuously intermittently releasing said dense liquor for delivery outside said receptacle.

Figure 5:
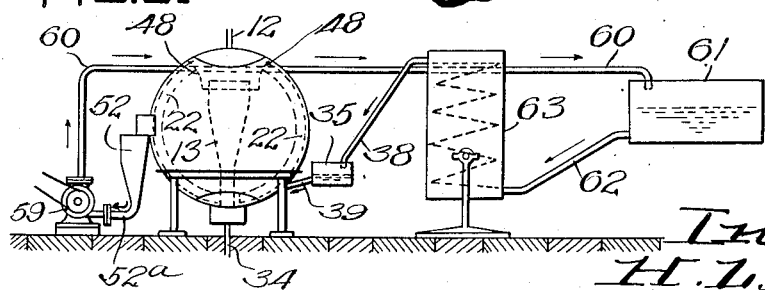
Figure 2:
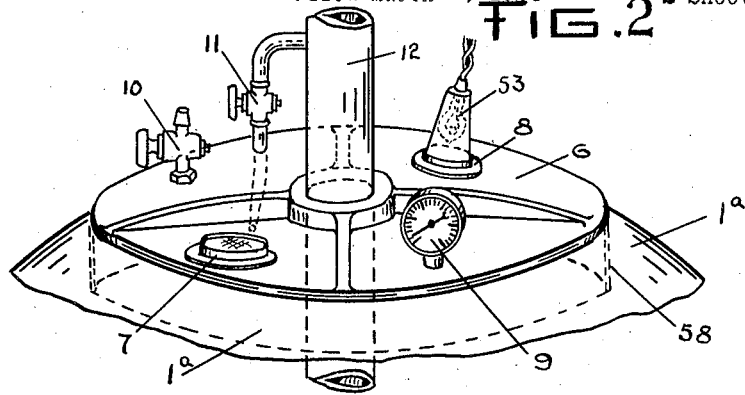
Figure 3:
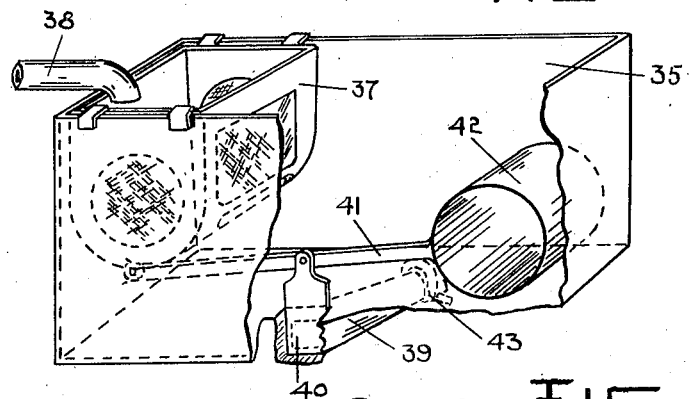
Figure 4:
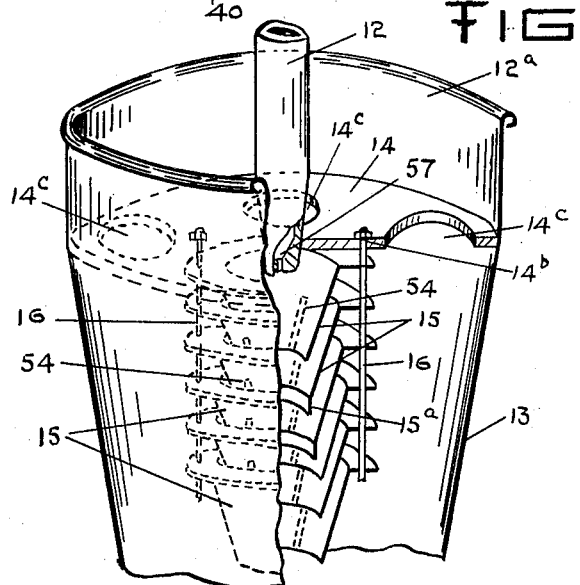

The idea or principle of the invention is carried into effect by the preferred embodiment thereof hereinafter described and illustrated in the accompanying drawings in which Figure 1 is a general view part sectional of the apparatus, Figure 2 is a perspective view of the top of the apparatus showing cocks, gauge and inspection ports, Figure 3 is a perspective and sectional view of the supply tank, Figure 4 is a perspective and sectional view of part of the condenser cones and spider. Fig. 5 is an outline showing the complete apparatus for continuous circulatory operation according to my method.

The apparatus according to my invention comprises a preferably spherical container 1 consisting of a top segment 1$^a$ and a bottom segment 1$^b$ mounted on legs 2. The top segment 1$^a$ forms a lid and is fitted with an angle ring 4 to correspond with an angle ring 5 fitted on the bottom segment 1$^b$, the two rings 4, 5 being secured tightly together by joint clamps 56 with packing 55 between the rings. These angle rings 4 and 5 are hinged at one side by hinges 4$^a$, 5$^a$ so that the top segment or lid may be opened and the whole of the interior of the container rendered accessible. On the top centre of the lid 1$^a$ (see Figure 2) is fitted a casting 6 on which is mounted two inspection ports 7 and 8 (the latter being also a lighting port) a vacuum gauge 9, vacuum cock 10, and spray pipe 11 for cleaning the glass of the lighting port 8. A water supply pipe 12 passes through casting 6 vertically and diametrically or axially to the condenser (12$^a$) which is situated vertically and diametrically in the centre of the container 1 and consists (see Figures 1 and 4) of a coned cylinder 13, a spider 14 having a central hole 14$^a$ for the jet 57, spaced holes 14$^b$ preferably four for the bolts 16, and spaced holes 14$^c$ preferably four for admitting vapours and odour to the condenser. A series of cones 15 preferably about sixteen in number are held in position by the bolts 16 and are spaced by distance pieces 54. The number of the cones for any particular apparatus may be more or less and can easily be ascertained by a few trials. These cones shown in part enlarged in Figure 4 have their lower openings 15$^a$ increasing in size from the top downwards as shown in Figure 1. This increase is preferably one thirty-second ($\frac{1}{32}$) of an inch. This construction disposes of the air bubbles that collect and enables them to be shot out and not condense as they otherwise would do and so increase the diameter of the water jet and the condenser would be flooded and a block caused. The bottom 13$^a$ of cylinder 13 is screwed on to the discharge pipe 17 which is vertically and diametrically in the center of the container and in line with the condenser. Around the outside of discharge pipe 17 where it passes out of container 1 is fitted a sleeve 18. To the base of container 1 is fitted a stuffing box casting 19 which fits round the outside of sleeve 18 having the gland point 20. The top portion of sleeve 18 is formed within the container 1 into palms 21 to which are secured the paddles or sweeps 22 extending up to the baffle 48 preferably curved to correspond with the inside of container 1. A collar 23 is fitted on pipe 17 within the container 1 to prevent sleeve 18 from working upwards at the taper joints 24. Immediately below the stuffing box 20 a wormwheel 25 is keyed on to sleeve 18 and is driven by belting 26 through the medium of pulley 27 shafting 28 and worm 29 suitably mounted in bearings from frame 30. The wormwheel 25 revolves paddles or sweeps 22 round the walls of the chamber 1. The bottom end of sleeve 18 below the wormwheel 25 is fitted with a stuffing box 31. The whole of this gear except the pulley 27 is encased in a housing 32 to enable the gearing to be run in an oil bath. An inspection door 32$^a$ is fitted on one side of the housing 32. The base of discharge pipe 17 is provided with a flange 33 secured to base of housing 32 thus making the whole rigid and tight. An extension discharge pipe 34 is bolted to flange 33 and carries the water passing through it away to any suitable place and preferably to a water seal such as a barrel of water into which the end of pipe 34 is inserted.

On one side of the container 1 immediately below the jointing ring 5 is mounted a receiving tank 35 supported on a suitable bracket 36, 36$^a$ the member 36$^a$ resting on and being secured to angle ring 3. One end of tank 35 is fitted with a removable strainer 37 (see Figure 3) which receives the fluid brought from the source of supply and discharged into it from pipe 38. The outlet 39 in the base of the tank 35 is fitted with a supply valve 40 which is worked by lever 41 and float 42. The end of outlet 39 is fitted with a coupling 43 by which means it is connected to inlet pipe 44 (see Figure 1). The inlet 44 may be placed preferably near the bottom of the container instead of in the position shown in Figure 1.

A releaser 45 is fitted in a convenient place on the container 1 so that its valve 47 is below a circular baffle plate 48 which is located in the container 1 to restrict the rise of the fluid up the sides of the container under the swirling action of the sweeps 22. This baffle plate 48 may be placed preferably nearer the top of the container about on a level with the top of the condenser and may be curved or dome shaped in cross section to induce a circulation of the fluid outside the condenser and around the side of the container so as to hold the cream in the pan for a longer period. A second circular baffle 58 is provided at the top of the container to deflect any fluid that may rise to that height away from the condenser. The releaser 45 is governed by a pulsator 49 of any suitable make which receives its vacuum from the container 1 or from an independent or supplementary source through cock 50 and admits it into the releaser 45 by means of pipe 51. The fluid is discharged from releaser 45 through valve 49ª into receiver 52.

The operation is as follows:—

All the various parts are assembled, valves closed, connections made and joints made tight. The container is sterilized by blowing live steam thereinto. Water under high pressure is then turned on through pipe 12 and jet 57 by which it is admitted at high pressure into the condenser which will thus create a vacuum in the container 1. When the desired vacuum is obtained in container 1 the revolving sweeps in the container are set in motion. The fluid to be handled is allowed to flow at a relatively high temperature in comparison with that in the vacuum container from a Pasteurizer or other suitable forewarmer not shown through pipe 38 into the receiving tank attached to the outside of the container. The fluid after passing through the strainer provided, is admitted into the container through the inlet pipe 44 and distributing pipe 44ª. This inlet port is kept sealed with the fluid in the receiving tank by means of the slide valve and float. When the fluid rises in the receiving tank above a prearranged height the float rises with it and automatically lifts the slide valve and opens the inlet port thus allowing the fluid to flow into the container.

When the fluid has fallen to a prearranged level the valve closes leaving sufficient height of fluid above the inlet to seal same. As the fluid flows through the distributing pipe it becomes subject to the vacuum in the container whereupon the excess heat in the fluid forms myriads of vapour bubbles in it thus causing frothing or expansion.

The end of the distributing pipe 44ª is gradually increased in diameter to accommodate the expansion of the fluid thus reducing the possibility of its being atomized on its entering into the vacuum or rarefied atmosphere of the container.

The incoming fluid is then taken control of by the revolving sweeps which exert a centrifugal action thereon thus swirling the fluid to conform to the contour of the container. As displacement is caused by the continuous inrush of fluid the direction of flow is spirally upwards impelled by the sweeps until the circular baffle plate is encountered which prevents the further upward course of the fluid with the resulting tendency for the fluid to accumulate at this point thus increasing the centrifugal force there. Should the fluid however swirl upwards past the circular baffle it is met by another circular baffle 58 at the top of the container and deflected downwards and away from the condenser.

When the releaser which is automatically worked by a pulsator is under vacuum equal to the vacuum in the container the fluid acting on the gate valve causes it to open and allows the fluid to flow into the releaser. Air now being admitted by the pulsator into the releaser breaks the vacuum therein and causes the gate valve to the container to close and allows the weight of the fluid to open the outer gate valve and flow out into a suitable container provided. This operation is automatically repeated. For a continuous operation the fluid is collected from any source in a tank 61 from which it descends by pipe 62 to the bottom of a forewarmer such as a Pasteurizer 63 it is then raised in a known manner to the top of the forewarmer so as to descend by pipe 38 to tank 35 from which it is discharged into the container 1 from which it is released into chamber 52 and pipe 52ª whence a rotary pump 59 or the like drives it back through pipe 60 to the tank 61 and the operation is repeated as often as is desired to attain the desired concentration.

The vapours and gas bubbles are emitted from the fluid whilst it is being swirled round the sides of the container and they are drawn upwards and into the condenser ejector whence they are exhausted or discharged through the tail or discharge pipe into the atmosphere. The process can be inspected at any time by placing light 53 over inspection port 8 and looking through inspection port 7 after clearing the glass on the inside by turning on water jet 11 for a few moments.

All the fluid having now been treated, in order to stop the operation of the apparatus, air is admitted into the container by opening the vacuum cock thus breaking the vacuum in the container. The water is then turned off from the condenser, and the revolving sweeps are brought to rest.

The small remaining quantity of fluid left in the container is then drained off by means of a drain pipe and cock 46 provided in the base thereof.

The clamps or fastenings can now be removed from the circular joint of the container and the lid opened up, the parts taken adrift and the whole cleansed and sterilized ready for the next operation.

I claim:

1. An apparatus for the purposes set forth comprising a container, means for creating a vacuum in said container, means for introducing a hot fluid into said container, means for swirling said fluid in said container to and up the side of said container, means for intermittently discharging said fluid from said container whilst retaining said vacuum and means for continuously discharging vapour removed from said fluid from said container.

2. The apparatus for the purpose set forth comprising a container, means for creating a vacuum in said container, means for introducing a hot fluid into said container, means for automatically intermittently discharging said fluid from said container whilst retaining said vacuum, means for continuously discharging vapor removed from said fluid and means for swirling the fluid to and round and up the walls of the container, said means comprising a series of sweeps working around the walls of said container.

3. Method of deodorizing, cooling and dehydrating fluids which consists in reducing the pressure to a desired point in a closed container, heating the fluid to be treated outside of said container, introducing said heated fluid to said container automatically, cooling all of and vapourizing part of said fluid in said container by the reduced pressure therein, swirling said heated fluid to the wall of said container, discharging the vaporized portion of said fluid from said container, intermittently automatically releasing the fluid from said container whilst retaining the reduced pressure therein, conveying said discharge fluid back to be reheated and repeating the operation.

4. Method of deodorizing cooling and dehydrating fluids which comprises reducing the pressure to a desired point in a closed container, heating the fluid to be treated outside said container, introducing said fluid into said container at a regulable rate, cooling all of and vapourizing portion of said fluid in said container by the reduced pressure therein, applying centrifugal force to said fluid whereby the denser portion thereof is swirled outwards to the wall of the container, discharging the vapourized portion of said fluid continuously from said container and intermittently automatically releasing the remaining fluid for delivery outside said container whilst retaining the reduced pressure therein.

In testimony whereof I affix my signature.

HENRY LAMONT MURRAY.